Feb. 21, 1967　　　　　　H. LAMPARTER　　　　　3,305,688
PHOTOSENSITIVE APPARATUS AND METHOD FOR THE
CONTINUOUS MEASUREMENT OF THE FIBROUS
MASS OF A TEXTILE FIBRE SLIVER
Filed Nov. 22, 1963　　　　　　　　　　　　　2 Sheets-Sheet 1
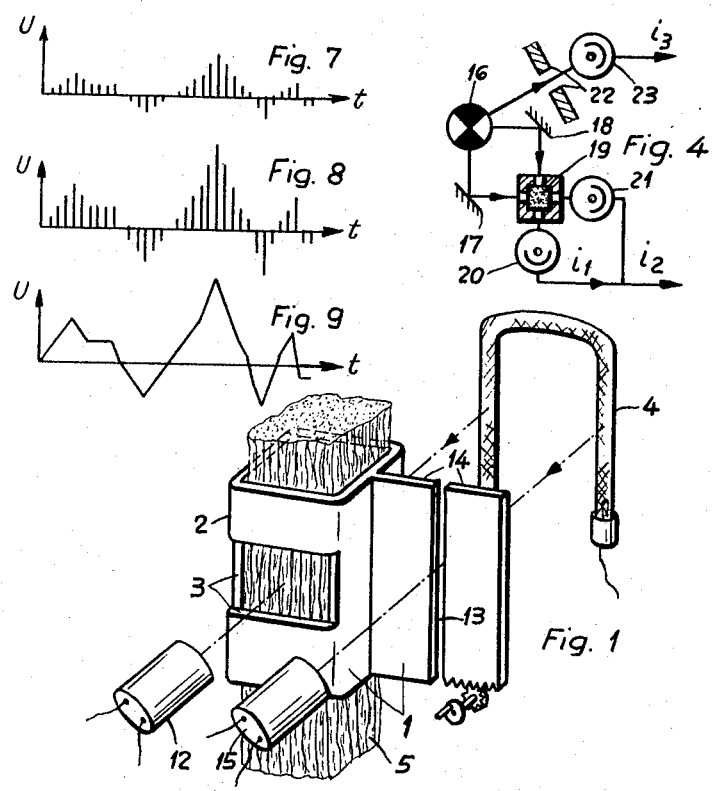
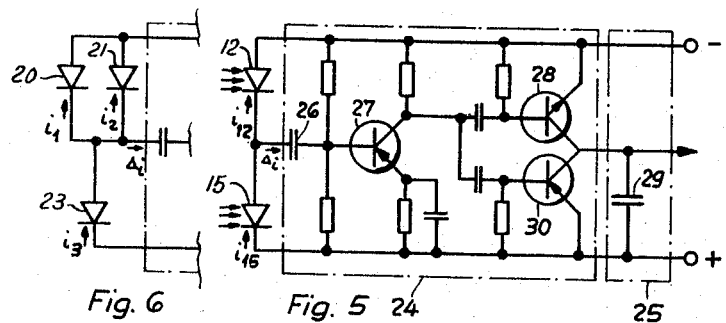
INVENTOR.
HANSRUEDI LAMPARTER
BY K. A. Mayr
ATTORNEY.

INVENTOR.
HANSRUEDI LAMPARTER
BY
ATTORNEY.

United States Patent Office 3,305,688
Patented Feb. 21, 1967

3,305,688
PHOTOSENSITIVE APPARATUS AND METHOD FOR THE CONTINUOUS MEASUREMENT OF THE FIBROUS MASS OF A TEXTILE FIBRE SLIVER
Hansruedi Lamparter, Winterthur, Switzerland, assignor to Maschinenfabrik Rieter A.G., Winterthur, Switzerland, a corporation of Switzerland
Filed Nov. 22, 1963, Ser. No. 325,568
Claims priority, application Switzerland, Nov. 23, 1962, 13,825/62
4 Claims. (Cl. 250—219)

The present invention relates to the continuous measurement of the fibrous mass of a textile fibre sliver as it passes through a guide channel.

According to the invention, there is provided a method of determining, with the aid of electro-magnetic waves, the fibrous mass of a textile fibre sliver passing through a guide channel comprising the steps of generating two high intensity radiation impulses succeeding each other at short intervals and issuing from the same radiation source, absorbing one ray by passing it through the fibrous mass, absorbing the second ray by passing it through an adjustable shutter, converting the said waves into electric impulses of equal duration and equal interval and producing discontinuous differential impulses which are subsequently converted into a continuous signal by mean-value formation, the said continuous signal being proportional to deviations of the fibrous mass from a pre-set value.

The invention also provides an apparatus for carrying out the method which comprises a guide channel through which sliver can pass, the said channel having opposed apertures, a high-intensity stroboscope lamp for emitting periodic light impulses of short duration arranged in front of the opposed apertures on one side of the channel and in front of a shutter, two co-ordinatively connected photo-electric cells, arranged on the other side of the channel to receive the said impulses and an impulse amplifier and an impulse integrator by which the differential signal of the photo-electric cells can be converted to a continuous signal.

The measurement of the sliver with such rapidly succeeding impulses of short duration of electromagnetic waves has the following advantages over continuous scanning:

(a) Substantially greater stability of the measured variable on changes in the intensity of radiation and in the sensitivity of the receiver due to variations in the mains voltage, variations of temperature, fatigue processes, etc.

(b) Impulse amplifiers of simple construction can be used, instead of high-stability D.C.-amplifiers.

(c) For a given sensitivity of the receiver, the output of the radiation source can be smaller by several magnitudes, whereby the heat evolved, the dimensions and current consumption are substantially reduced.

(d) The possibility is given of studying slivers of such thickness and absorbing power which otherwise could yield a suitable signal only when employing light sources involving an extraordinarily high expenditure of energy and receivers of extreme sensitivity.

(e) The use waves of the visible spectrum has the additional advantage that both the radiation source (light source) and the receivers (photo-electric cells) may consist of very simple elements.

An embodiment of the invention is illustrated in the accompanying drawings, in which:

FIGURE 1 is a perspective schematic view of a measuring head;

FIGURE 4 is a diagram of a multiple-point measuring head;

FIGURE 5 is a circuit diagram of an impulse amplifier and of an integrator;

FIGURE 6 illustrates a variant of FIGURE 5;

FIGURES 7, 8 and 9 are voltage-duration diagrams at various outlet points of the circuit diagram according to FIGURE 5;

Figure 2:
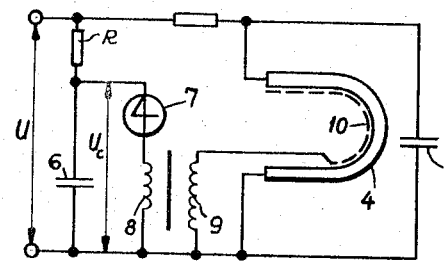
FIGURE 2 is a circuit diagram for a stroboscope.
Figure 3:
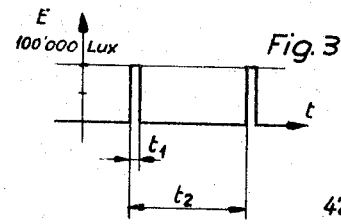
FIGURE 3 is a light-intensity diagram.

FIGURE 1 illustrates a measuring head 1 which consists of a tube 2 with opposed apertures 3 and a high intensity stroboscope lamp 4. A compact fibre sliver 5 passing through the tube 2 is irradiated with light impulses of short duration.

The periodical brief ignition of the stroboscope lamp 4 is produced by the circuit illustrated in FIGURE 2. A voltage U of, for example, 400 v. charges a capacitor 6 to a voltage $U_c$ to about 200 v., at which voltage a parallel-connected Shockley-diode 7 becomes conducting. The voltage $U_c$ from the capacitor is applied to a primary winding 8 of an impulse transformer and induces in the secondary winding 9 of the transformer a voltage which ignites a lining 10 of the stroboscope lamp 4, whereupon the capacitor 11 is discharged through the stroboscope lamp 4. This discharge is of a very short duration and produces a flash. This operation is thereupon repeated. The light impulses thus have an intensity E of the order of 100,000 Lux, as measured on the staple fibre strand such as a sliver, and have a duration $t_1$ of about 10 microseconds, for an interval $t_2$ of about 3000 microseconds. A photo-electric cell 12 (photo-diode) located on the opposite side of the tube 2 (see FIGURE 1) serves to transform the luminous energy not absorbed during the passage through the fibre sliver 5 into an electric current impulse $i_{12}$ (FIGURE 5). An identical periodic light ray of equal duration is also passed from the same lamp 4 through a shutter 14 constituted by a slit 13 of adjustable width, and is taken up, unabsorbed, by a second photo-electric cell 15, which in turn yields an electric current impulse $i_{15}$ (see FIGURE 5).

FIGURE 4 shows a modification in which instead of a simple translumination of the fibre sliver there is employed a double translumination. In this case, light rays are passed from a stroboscope lamp 16 to two reflectors 17, 18 and thence through a fibre sliver 19 located in the tube. Each of the two absorbed light rays falls on to a photo-electric cell 20 or 21. These cells are connected in parallel so that the currents $i_1$ and $i_2$ from the cells are added to each other. A third ray passes through an adjustable shutter 22 to a photo-electric cell 23 which produces a photo-current $i_3$.

The difference ($\Delta_1$) of the currents $i_{12}-i_{15}$ or $i_1+i_2-i_3$, which are produced by the circuits shown in FIGURES 5 and 6, then passes to an impulse amplifier 24. The photo-electric cell 15 or 23 associated with the shutter 14 or 22 is co-ordinatively connected with the cell 12 or 20, 21 associated with the sliver, so that for a pre-set reference value of the slit 13 or 22 and for a fibrous mass corresponding to these reference values passing through the tube such amounts of light pass to the cells that their photo-electric currents mutually cancel each other and no signal is produced. Consequently, the thinner the sliver the stronger the illumination of the cell 12 or 20 and/or 21 so that there is produced an electric impulse of corresponding polarity and a deviation of corresponding magnitude. The polarity of the impulse changes with a thicker sliver (see FIGURE 7). The differential current pulses $\Delta_1$ of the photo-diodes pass through a coupling capacitor 26 to an impulse amplifier 24 and subsequently to an impulse integrator 25. The amplifier 24 contains a transistor 27 and a push-pull amplifier, and a positive impulse charges a capacitor 29 of the impulse integrator 25 through a transistor 28. A negative impulse would pass through a transistor 30 of the impulse amplifier and would discharge the capacitor 29. When the currents $\Delta_1$ reach the impulse amplifier 24, they are amplified to a signal according to FIGURE 8 and then pass to an impulse integrator 25, which converts them into a continuous uniform voltage signal according to FIGURE 9.

Figure 10:
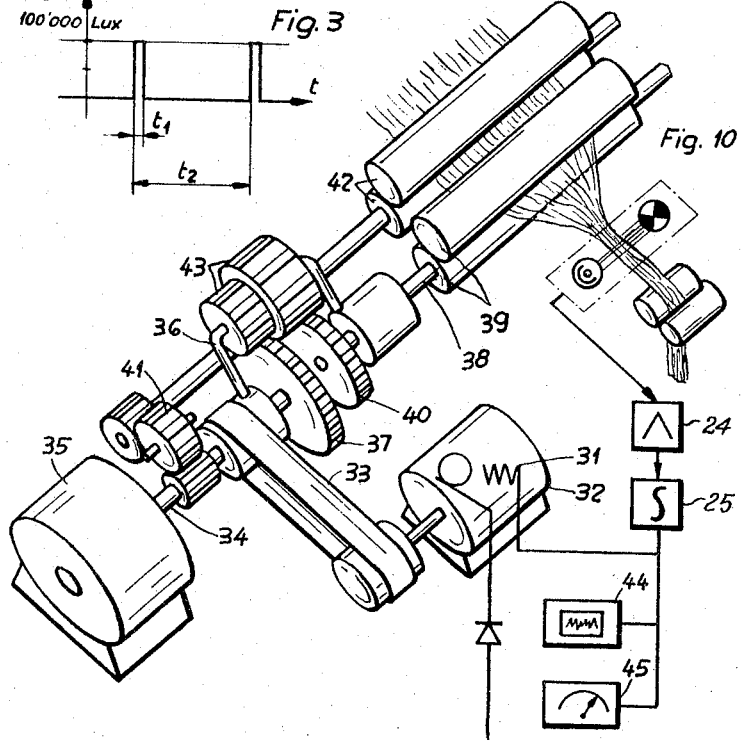
FIGURE 10 illustrates an application for a subsequent use of the signal generated by the measuring head.

FIGURE 10 shows an example of how the signal available at the output end of the mean value integrator can be put to use in a drafting apparatus. The integrator connected into the field 31 of a D.C.-motor 32. The motor 32 rotates in the forward or reverse direction in response to the signals. Rotation of the motor is transmitted over a belt drive 33 to a freely rotatable crank 36 on a shaft 34 of a second or drive motor 35. The shaft 34 also carries a spur wheel 37. Coaxially of the shaft 34, is provided an extended shaft 38 of a pair of delivery rollers 39 of the drafting mechanism. The shaft 38 carries a spur wheel 40 and is freely rotatable on a second arm of the crank 36. A pair of feed rollers 42 of the drafting mechanism are driven by the motor 35 through an intermediate gear train 41. A pair of spur wheels 43 is seated on the crank 36 and meshes with the spur wheels 37 and 40. The crank 36 is rotated clockwise or counterclockwise, in response to the signals fed to the field 31 of the motor 32 so that the delivery rate of the delivery rollers 39, and thus of the drafting, are correspondingly altered. The same signal can also be fed to a recording device 44 or an indicator 45.

What I claim is:

1. A method of determining the fibrous mass of a textile fibre sliver comprising the steps of passing a fibrous mass through a guide channel, generating in quick succession a plurality of high-intensity light impulses from a common light source and directing said impulses in three separate paths, two of said paths passing through said fibrous mass, the third of said paths passing through an adjustable shutter; converting said impulses at the end of said paths into electrical impulses of equal direction and equal intervals, the electrical impulses produced passing through said fibrous mass being added together; producing discontinuous differential impulses from the said added impulses and said impulses of said third path; and converting said differential impulses into a continuous signal which is proportional to deviations of said fibrous mass from a pre-set value.

2. An apparatus for determining the fibrous mass of a textile fibre sliver comprising a guide channel interposed in the path of the sliver for compacting the sliver passing therethrough, said guide channel having a pair of opposed apertures on opposite sides of the path of the sliver, an adjustable shutter positioned adjacent said guide channel, a high-intensity stroboscopic lamp disposed relative to said guide channel and said adjustable shutter for passing high-intensity radiation impulses of short duration through said guide channel apertures to irradiate the compacted sliver and said adjustable shutter, and at least a pair of photoelectric cells for producing signals in response to light received thereon from said lamp, at least one of said photoelectric cells being disposed relative to said guide channel for receiving light passing through said guide channel apertures, and another of said photoelectric cells being disposed relative to said adjustable shutter for receiving light passing through said adjustable shutter, means operatively connected to said photoelectric cells for receiving the produced signals therefrom, said means including an impulse amplifier and an impulse integrator sequentially connected to each other for coordinating and converting the differential of the received produced signals into a single continuous signal whereby the mass of the sliver passing through said guide channel can be determined.

3. In a textile drafting apparatus having a pair of delivery rollers for delivering sliver, a means for determining the fibrous mass of a textile fibre sliver, said means comprising a guide channel interposed in the path of the sliver for compacting the sliver passing therethrough, said guide channel having a pair of opposed apertures on opposite sides of the path of the sliver, an adjustable shutter positioned adjacent said guide channel, a high-intensity stroboscopic lamp disposed relative to said guide channel and said adjustable shutter for passing high-intensity radiation impulses of short duration through said guide channel apertures to irradiate the compacted sliver and said adjustable shutter, at least a pair of photoelectric cells for producing signals in response to light received thereon from said lamp, at least one of said photoelectric cells being disposed relative to said guide channel for receiving light passing through said guide channel apertures, and another of said photoelectric cells being disposed relative to said adjustable shutter for receiving light passing through said adjustable shutter, means operatively connected to said photoelectric cells for receiving the produced signals therefrom, said means including an impulse amplifier and an impulse integrator sequentially connected to each other for coordinating and converting the differential of the received produced signals into a single continuous signal, and means for controlling the rate of said delivery rollers in response to the single continuous signal.

4. A method of determining the fibrous mass of a textile fibre sliver comprising the steps of compacting the sliver to uniform dimensions within a confined passage in the path of the sliver, generating a pair of high-intensity radiation impulses in succesive relation to each other at short intervals from a common radiation source, passing one of said impulses through the compacted sliver for absorption therein to produce a first light beam, passing the other of said impulses through an adjustable shutter to produce a second light, producing signals in response to the light beams, converting said signals into electric impulses of equal duration and interval, producing discontinuous differential impulses in response to the difference of said electric impulses, and subsequently converting said differential impulses into a single continuous signal proportional to deviations of the fibrous mass from a pre-set value.

References Cited by the Examiner

UNITED STATES PATENTS

| | | | |
|---|---|---|---|
| 2,510,347 | 6/1950 | Perkins | 250—219 X |
| 2,548,755 | 4/1951 | Vossberg et al. | 250—219 X |
| 2,682,144 | 6/1954 | Hare | 19—240 X |
| 3,233,110 | 2/1966 | Senseney | 250—239 |

RALPH G. NILSON, *Primary Examiner.*

WALTER STOLWEIN, *Examiner.*